(12) United States Patent
Noguchi et al.

(10) Patent No.: US 11,161,432 B2
(45) Date of Patent: Nov. 2, 2021

(54) SEAT LOCK APPARATUS (71) Applicants: MITSUI KINZOKU ACT CORPORATION, Kanagawa (JP); TOYOTA JIDOSHA KABUSHIKI KAISHA, Aichi-ken (JP); KABUSHIKI KAISHA TOYOTA JIDOSHOKKI, Aichi-ken (JP); TOYOTA BOSHOKU KABUSHIKI KAISHA, Aichi-ken (JP)

(72) Inventors: Katsunori Noguchi, Kanagawa (JP); Keiichirou Inoue, Aichi (JP); Atsushi Koizumi, Aichi (JP); Takahiro Nakae, Aichi (JP)

(73) Assignees: MITSUI KINZOKU ACT CORPORATION, Kanagawa (JP); TOYOTA JIDOSHA KABUSHIKI KAISHA, Aichi (JP); KABUSHIKI KAISHA TOYOTA JIDOSHOKKI, Aichi (JP); TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 17/050,795

(22) PCT Filed: Sep. 4, 2018

(86) PCT No.: PCT/JP2018/032777
§ 371 (c)(1),
(2) Date: Oct. 26, 2020

(87) PCT Pub. No.: WO2019/207814
PCT Pub. Date: Oct. 31, 2019

(65) Prior Publication Data
US 2021/0122268 A1    Apr. 29, 2021

(30) Foreign Application Priority Data

Apr. 27, 2018  (JP) .............................. JP2018-087012
May 31, 2018  (JP) .............................. JP2018-105025

(51) Int. Cl.
*B60N 2/22*         (2006.01)
(52) U.S. Cl.
CPC .................................. *B60N 2/2245* (2013.01)
(58) Field of Classification Search
CPC ........ B60N 2/2245; B60N 2/366; B60N 2/20; B60N 2/22; B60N 2/433; B60N 2/10;
(Continued)

(56) References Cited

U.S. PATENT DOCUMENTS 4,995,654 A * 2/1991 Nishigami .............. E05B 77/12
                                                   292/216
6,945,585 B1 * 9/2005 Liu ..................... B60N 2/01583
                                                   292/216

(Continued)

FOREIGN PATENT DOCUMENTS

| JP | H02-002240 U | 1/1990 |
| JP | 2011-73549 A | 4/2011 |
| JP | 4847901 B2 | 12/2011 |

OTHER PUBLICATIONS

Decision to Grant a Patent issued in corresponding Japanese Patent Application No. 2018-105025, dated May 26, 2020, with English translation.

(Continued)

*Primary Examiner* — Mark R Wendell
(74) *Attorney, Agent, or Firm* — McDermott Will & Emery LLP (57) ABSTRACT

A seat lock apparatus that keeps a seat back of a vehicle in a locked state, and is at least partially covered with a cover, includes: a hooking member having an engaging groove that (Continued)

engages with a striker that enters from a back side; a shaft member that rotatably and pivotally supports the hooking member in a vicinity of a front end; a case member to which the shaft member is fixed; a striker entry groove formed on the case member and to which the striker enters; and a pair of projectional holding members provided respectively on both sides of the striker entry groove and projecting backward. Further, the cover is held by inserting the pair of projectional holding members into a holding member insertion hole provided on the cover.

4 Claims, 7 Drawing Sheets

(58) Field of Classification Search
CPC .......... B60N 2/01583; B60N 2/01516; B60N 2/01541; E05L 385/00; E05L 385/24
USPC .......... 297/354.12, 378.11, 378.13, 335, 336
See application file for complete search history.

(56) References Cited

U.S. PATENT DOCUMENTS

| | | | | |
|---|---|---|---|---|
| 7,044,552 | B2* | 5/2006 | Muller | B60N 2/01583 296/65.03 |
| 7,575,280 | B2* | 8/2009 | Palomba | B60N 2/01583 296/65.03 |
| 8,029,030 | B2* | 10/2011 | Shimura | E05B 83/16 292/216 |
| 8,282,141 | B2* | 10/2012 | Paing | B60N 2/01583 292/216 |
| 9,771,002 | B2* | 9/2017 | Demirci | B60N 2/01583 |
| 10,214,124 | B2* | 2/2019 | Noguchi | B60N 2/2245 |
| 10,308,142 | B2* | 6/2019 | Gordeenko | B60N 2/366 |
| 2006/0082204 | A1* | 4/2006 | Zhang | B60N 2/01583 297/366 |
| 2009/0033138 | A1* | 2/2009 | Yamada | B60N 2/366 297/378.13 |
| 2009/0056393 | A1* | 3/2009 | Otsuka | B60N 2/3011 70/205 |
| 2009/0295186 | A1* | 12/2009 | Kokubo | B60N 2/2245 296/65.16 |
| 2010/0032967 | A1* | 2/2010 | Otsuka | B60N 2/01583 292/240 |
| 2011/0175420 | A1* | 7/2011 | Bruck | B60N 2/2245 297/364 |
| 2013/0129413 | A1* | 5/2013 | Dryburgh | B60N 2/305 403/316 |
| 2015/0061349 | A1* | 3/2015 | Handl | B60N 2/2245 297/463.1 |
| 2015/0306991 | A1* | 10/2015 | Ban | E05B 85/26 297/463.1 |
| 2016/0010370 | A1* | 1/2016 | Sugiura | B60N 2/01583 292/96 |
| 2018/0290565 | A1* | 10/2018 | Tone | B60N 2/366 |

OTHER PUBLICATIONS

International Search Report issued in corresponding International International Patent Application No. PCT/JP2018/032777, dated Oct. 2, 2018, with English translation.

* cited by examiner

SEAT LOCK APPARATUS

CROSS REFERENCE TO RELATED APPLICATION

This patent application is the U.S. National Phase under 35 U.S.C. § 371 of International Application No. PCT/JP2018/032777, filed on Sep. 4, 2018, which designates the United States, which is based upon and claims the benefit of priority from Japanese Patent Application No. 2018-105025, filed May 31, 2018, and Japanese Patent Application No. 2018-087012, filed on Apr. 27, 2018, the entire contents of which are incorporated herein by reference.

Field

The present disclosure relates to a seat lock apparatus that keeps a seat back configured to be elevatable in a locked state, and more particularly to a seat lock apparatus that is at least partially covered with a cover.

Background

A seat of vehicles includes a seat cushion that is the seat surface and a seat back that is the backrest, where the seat back may be elevationally switched between the standing position for regular seating and the forward inclining position in which the seat back is forwardly inclined for convenience of loading. In the standing position for seating, a seat lock apparatus provided at the seat back is engaged with a striker fixed to the vehicle main body, and thus the seat back keeps a locked state and becomes stable. Also, the standing position may be two-stage switchable due to the internal mechanism of the seat lock apparatus. The seat lock apparatus is often covered with a cover mainly in terms of appearance design.

The seat lock apparatus includes, as its basic configuration, a striker that enters from the back side, a hooking member that has an engaging groove for engagement with the striker, a shaft member that rotatably and pivotally supports the hooking member in the vicinity of the front end, and a case member to which the shaft member is fixed. The case member has a striker entry groove to which the striker enters (see, e.g., Patent Literature 1).

CITATION LIST

Patent Literature

Patent Literature 1: Japanese Patent No. 4847901

SUMMARY

Technical Problem

A cover often covers two directional surfaces that are the outer surface and the rear surface of the seat lock apparatus, and assembling members are provided in these two directions. To assemble a cover, work needs to be performed in these two directions, and thus there is a demand for simplification of the work. Particularly, because a seat lock apparatus that allows two-stage switching of the seat back has a larger size and a larger cover is used accordingly, simplification of the assembling work is highly demanded.

The present disclosure is devised in light of the above problem, and an object is to provide a seat lock apparatus whose assembling work is easy.

Solution to Problem

To resolve the above problem and attain the object, according to the present disclosure, a seat lock apparatus that keeps a seat back of a vehicle in a locked state, and is at least partially covered with a cover, includes: a hooking member having an engaging groove that engages with a striker that enters from a back side; a shaft member that rotatably and pivotally supports the hooking member in a vicinity of a front end; a case member to which the shaft member is fixed; a striker entry groove formed on the case member and to which the striker enters; and a pair of projectional holding members provided respectively on both sides of the striker entry groove and projecting backward. Further, the cover is held by inserting the pair of projectional holding members into a holding member insertion hole provided on the cover.

The case member may include a case side portion on which the striker entry groove is formed, the pair of projectional holding members may project from a side abutment plate that abuts on the case side portion, and the side abutment plate may include an opening hole.

The seat lock apparatus may further includes: a front abutment plate fixed to a front portion of the case member, and the projectional holding members may be connected via a bent portion that is bent backward from the front abutment plate.

The striker may be a first striker, and the first striker may move integrally with a second striker that is separated by a fixed distance, and the engaging groove may engage with the first striker or the second striker to lock the seat back at a two-stage inclination angle.

Advantageous Effects of Invention

According to the seat lock apparatus of the present disclosure, a pair of projectional holding members that project backward are provided respectively above and below the striker entry groove, and a cover has holding member insertion holes to which the pair of projectional holding members are inserted. Thus, the assembling work is simplified.

DESCRIPTION OF EMBODIMENTS

Hereinafter, a seat lock apparatus 10 according to an embodiment is described in detail based on the drawings. Note that this embodiment does not limit the present disclosure.

Figure 1:
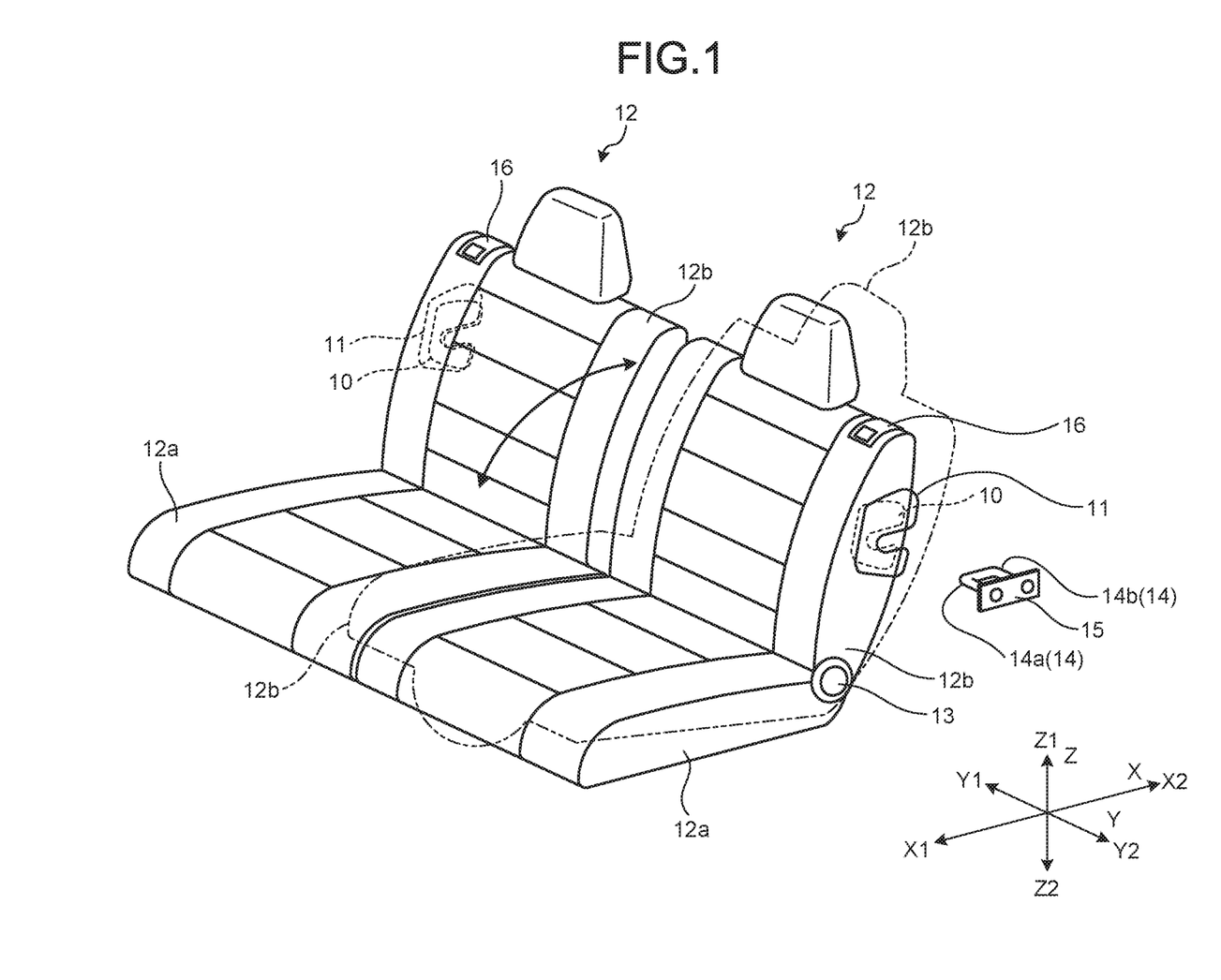
FIG. 1 is a schematic perspective view illustrating a seat to which a seat lock apparatus is applied.
Figure 2:
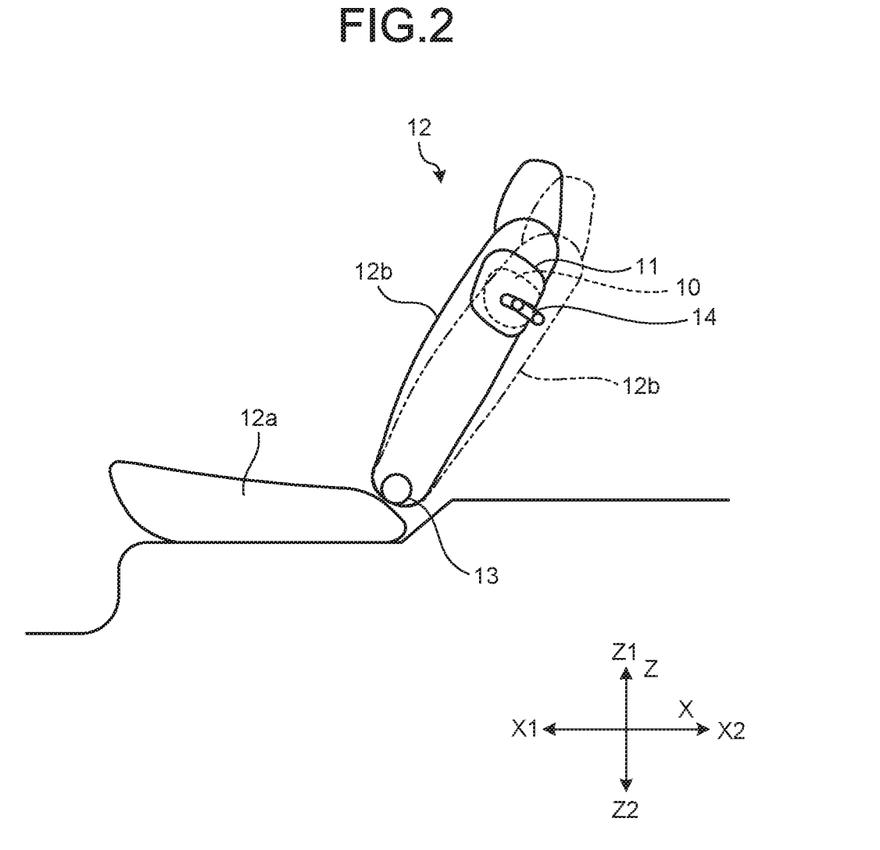
FIG. 2 is a schematic side view illustrating the seat to which the seat lock apparatus is applied.

As illustrated in FIG. 1 and FIG. 2, the seat lock apparatus 10 according to the embodiment is applied to left and right seats 12 of a vehicle. The seat lock apparatus 10 is partially covered with a cover 11. The seat 12 includes a seat cushion 12a that is the seat surface and a seat back 12b that is the backrest. The seat back 12b pivotally rotates around a seat back rotating shaft 13, and may be elevationally switched between the standing position for regular seating and the forward inclining position in which the seat back 12b is forwardly inclined for convenience of loading. Also, for the standing postion, it is two-stage switchable between a regular first standing position and a second standing position with a deeper inclination than that of the first standing position due to the mechanism of the seat lock apparatus 10. In FIG. 1, the first standing position of the seat back 12b is illustrated with solid lines, whereas the forward inclining position and the second standing position are illustrated with imaginary lines.

The seat lock apparatus 10 is provided inside and slightly below the shoulder portion of the seat back 12b and engages with a first striker 14a or a second striker 14b that are fixed to the vehicle body panel side and made of metal. This structure enables the seat back 12b to be locked in the two standing positions. Additionally, disengagement of the seat lock apparatus 10 and the first striker 14a and the second striker 14b allows the forward inclining position of the seat back 12b.

The first striker 14a and the second striker 14b are juxtaposed apart from each other by a fixed distance and their tips are interconnected to form a rectangle with an opening side, the opening side being fixed to a striker base 15. Either the first striker 14a or the second striker 14b is representatively referred to as a striker 14. The portion of the seat lock apparatus 10 that is not covered with the cover 11 is covered with the seat back 12b, and thus substantially the whole of the seat lock apparatus 10 is not visible except for the very small part where the striker 14 enters. Because the cover 11 is a visible part, it has an attractive design with a slightly rounded shape as a whole.

By elevating the seat back 12b from the forward inclining position, the first striker 14a first engages with the seat lock apparatus 10, resulting in the first standing position. Next, by operating an operation unit 16 that is provided at the shoulder portion of the seat back 12b, a disengagement of the seat lock apparatus 10 and the first striker 14a occurs, and then, by further elevating the seat back 12b, the second striker 14b engages with the seat lock apparatus 10 and the seat back 12b is locked in the second standing position, or by inclining forward again, the seat back 12b returns to the forward inclining position. Disengagement in the second standing position is also made by operating the operation unit 16.

The seat lock apparatus 10 is applied to each of the left and right seats 12 of the vehicle. In the following description, although the seat 12 on the left side of the vehicle (the front side in FIG. 1) and the seat lock apparatus 10 therein are described as an example, the right side components are symmetrical or substantially symmetrical to the left side components and have the same operational effect. Additionally, in the following description, the directions are based on the forward and backward, the inward and outward, and the upward and downward of the vehicle, and the seat back 12b basically takes the first standing position. In the drawings, for easy understanding, the forward and backward direction is illustrated with an arrow X, the forward direction with X1, the backward direction with X2, the vehicle width direction with Y, the inward direction with Y1, the outward direction with Y2, the upward and downward direction with Z, the upward direction with Z1, and the downward direction with Z2. Furthermore, for the relative motion of the seat lock apparatus 10 and the striker 14, descriptions are made based on the seat lock apparatus 10 where the striker 14 is displaced.

Figure 3:
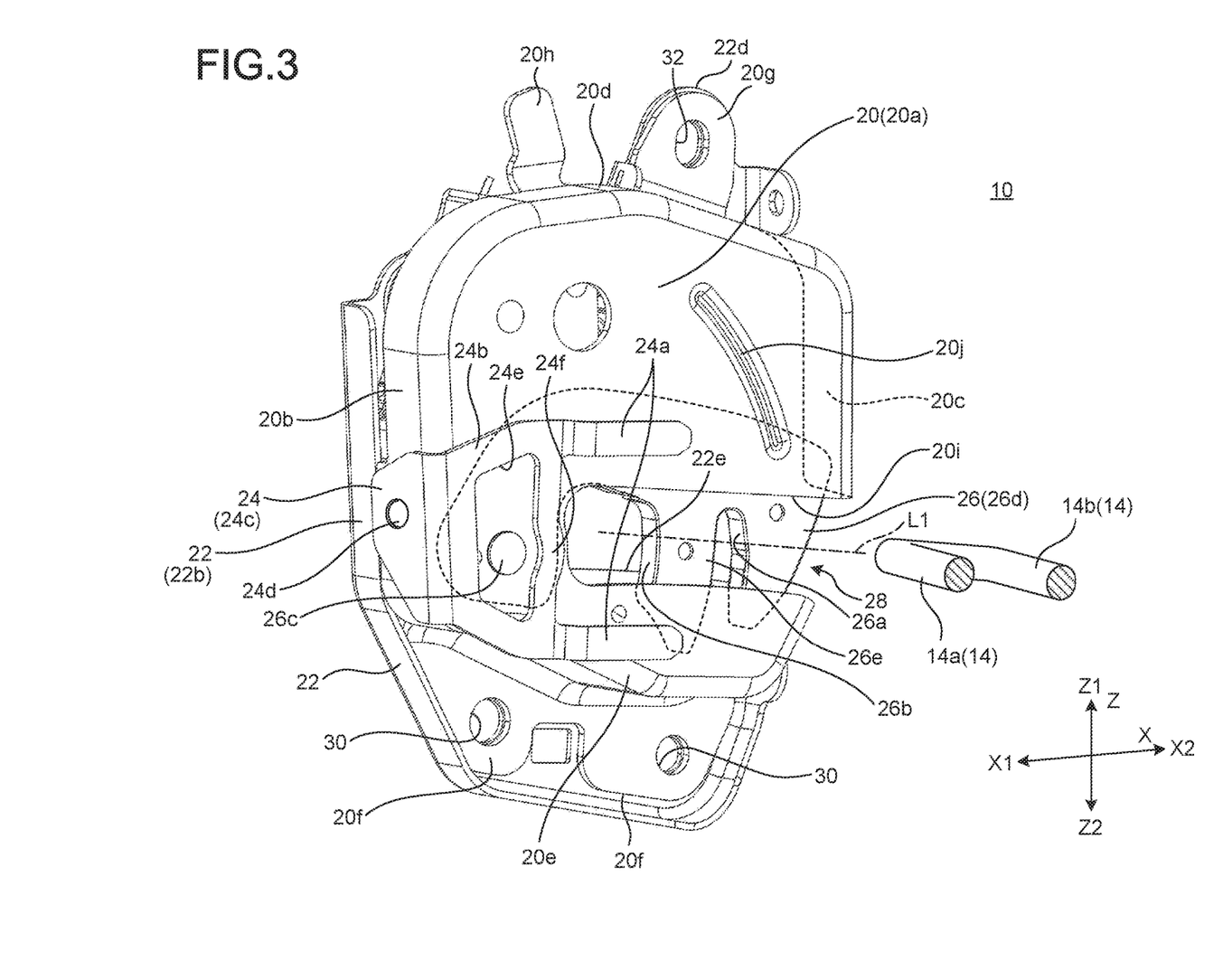
FIG. 3 is a perspective view of the seat lock apparatus.

As illustrated in FIG. 3, the seat lock apparatus 10 includes an outer case (case member) 20, an inner case 22, a cover holding member 24, and a hooking member 26 that engages with the striker 14. The hooking member 26 is a part of an internal mechanism 28. The outer case 20, the inner case 22, and the cover holding member 24 are, for example, metallic press molded parts. The hooking member 26 includes an engaging groove 26a with which the striker 14 engages, a loose-fit groove 26b, and a rotating shaft (shaft member) 26c. The engaging groove 26a is provided in the vicinity of the rear end, the loose-fit groove 26b in the center, and the rotating shaft 26c in the vicinity of the front end. The engaging groove 26a is a part where the front and rear thereof is sandwiched between a corner portion 26d and a sub-corner portion 26e.

The outer case 20 includes an outer surface 20a, a front surface 20b, a rear surface 20c, a top surface 20d, and a bottom surface 20e, the surfaces covering the internal mechanism 28. The outer case 20 further includes two mounting pieces 20f that are folded back from the bottom surface 20e and project downward, a mounting piece 20g that is folded back from the top surface 20d and projects upward, and a projectional holding piece 20h that is folded back from the top surface and projects upward. The projectional holding piece 20h is a component for temporary holding by being fitted with a fitting portion of the operation unit 16.

The gap between the outer surface (case side portion) 20a and the hooking member 26 in the vehicle width direction is narrow. On the outer surface 20a and the rear surface 20c, a striker entry groove 20i to which the striker 14 enters is provided. Because the seat lock apparatus 10 is a two-stage locking type, as described later, the striker entry groove 20i is formed to be long enough in the vehicle length direction to allow the first striker 14a to enter the loose-fit groove 26b. Because the striker entry groove 20i is long, the seat lock apparatus 10 is correspondingly large, and further the cover 11 that covers the seat lock apparatus 10 is also large. The striker entry groove 20i extends forward from the rear end of the outer case 20 to the vicinity of the rotating shaft 26c and crosses the rear surface 20c. The outer surface 20a pivotally supports the outer end of the rotating shaft 26c, where the rotating shaft 26c slightly projects from the outer surface 20a. On the outer surface 20a, an arcuate bulging portion 20j that is convex inward is provided. The arcuate bulging portion 20i is provided in accordance with the rotation range of the hooking member 26 with respect to the rotating shaft 26c as its center, and has a function to prevent the hooking member 26 from displacing outward by an external force.

The inner case 22 includes an inner surface 22a (see FIG. 4), a front surface 22b, and a rear surface 22c (see FIG. 4), the surfaces covering the internal mechanism 28. The inner case 22 combines with the outer case 20 to cover the internal mechanism 28. The front side of the internal mechanism 28 is covered with the front surface 20b and the front surface 22b, whereas the rear side of the internal mechanism 28 is covered with the rear surface 20c and the rear surface 22c. The lower part of the inner case 22 extends downward to almost the same position as the lower edges of the two mounting pieces 20f of the outer case 20. On the lower part of the inner case 22 and the two mounting pieces 20f, bolt holes 30 that are coaxial are provided. The inner case 22 includes a mounting piece 22d that projects upward. The mounting piece 22d and the mounting piece 20g have the same shape to overlap each other, and on which bolt holes 32 that are coaxial are provided. By inserting bolts into the bolt holes 30, 32 and screwing the bolts to the frame of the seat back 12b, the seat lock apparatus 10 is fixed. On the inner case 22, a striker entry groove 22e to which the striker 14 enters is provided. The striker entry groove 22e of the inner case 22 and the striker entry groove 20i of the outer case 20 almost overlap each other in a side view. The inner case 22 pivotally supports the inner end of the rotating shaft 26c.

The cover holding member 24 includes a pair of projectional holding pieces 24a, a side abutment plate 24b that abuts on the outer surface 20a, and a front abutment plate 24c that is fixed to the front surface 20b. The front abutment plate 24c has a substantially triangular shape that is convex inward, and is fixed to the front surface 20b with an emboss 24d in the center. The lower edge of the front abutment plate 24c almost corresponds to the lower edge of the front surface 20b.

The side abutment plate 24b is connected via a bent portion that is bent 90 degrees backward from the front abutment plate 24c, and has a substantially trapezoidal shape that spreads backward. The lower edge of the side abutment plate 24b almost corresponds to the front portion of the bottomsurface 20e. On the side abutment plate 24b, an opening hole 24e that has a substantially trapezoidal shape slightly smaller than the outline is provided, and does not interfere with the rotating shaft 26c. The plate thickness of the side abutment plate 24b is formed to be slightly greater than the projection amount of the rotating shaft 26c. The opening hole 24e may reduce the weight. At the middle of a vertically extending beam that forms the rear portion of the side abutment plate 24b, a curved portion 24f is formed with respect to the rotating shaft 26c as its center. The curved portion 24f allows a jig to be placed around the rotating shaft 26c when assembling. The rear end of the curved portion 24f almost abuts on the front end of the striker entry groove 20i. Any fixing unit that corresponds to the emboss 24d may be provided on the side abutment plate 24b.

The pair of projectional holding pieces 24a have a slightly long plate shape, bent slightly outward from the upper rear end and lower rear end of the side abutment plate 24b, further bent backward, and projected backward in parallel on both of the upper side and lower side of the striker entry groove 20i. The extending direction of the projectional holding pieces 24a is almost parallel with the striker entry groove 20i and a line L1 that is the entry route of the striker 14. Between the projectional holding pieces 24a and the outer surface 20a, a moderate gap is provided. The length of the projectional holding pieces 24a is substantially half of the length of the striker entry groove 20i in the forward and backward direction. As described later, the projectional holding pieces 24a hold the cover 11.

Figure 4:
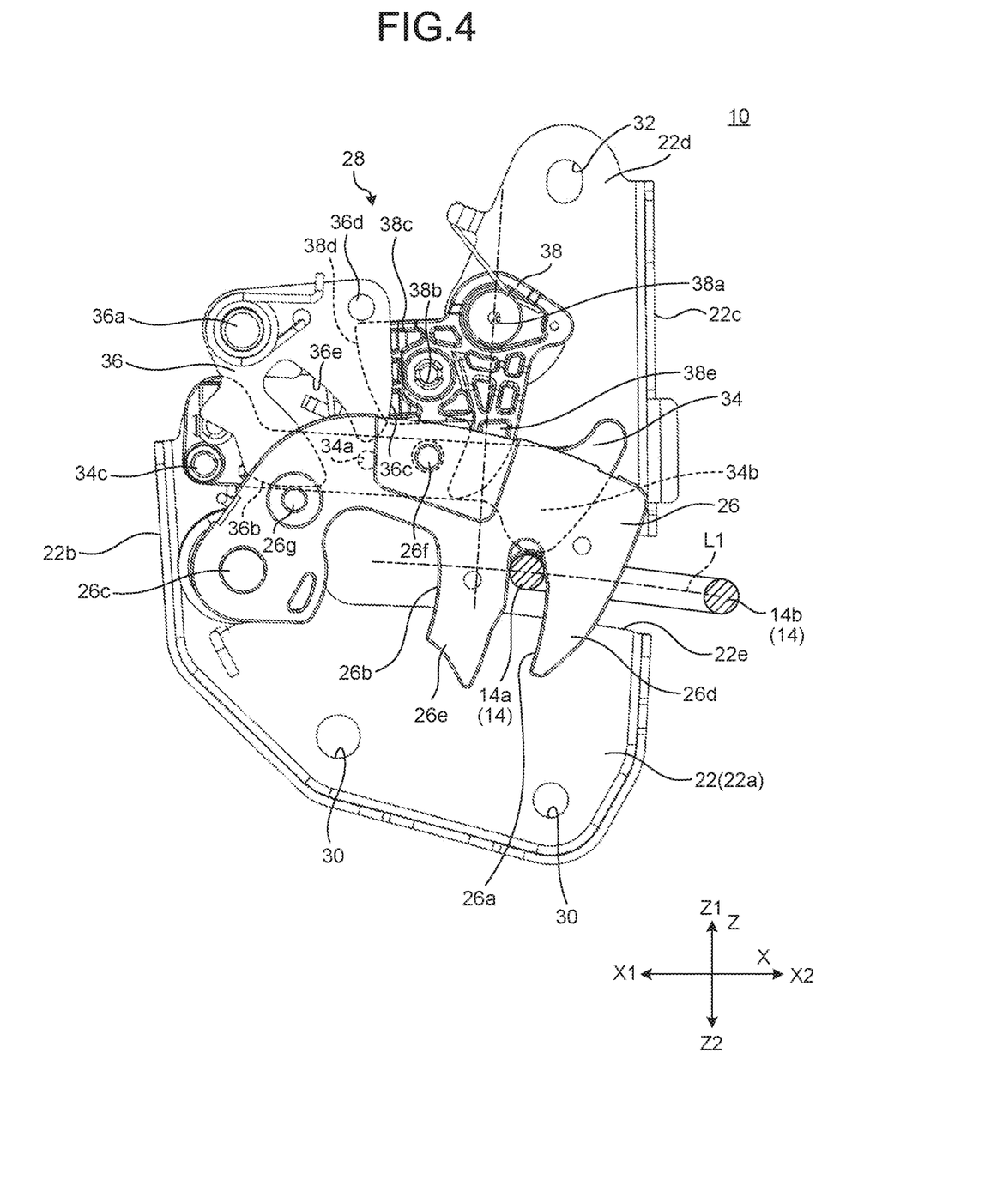
FIG. 4 is a partially omitted side view of the seat lock apparatus.

Next, as illustrated in FIG. 4, the internal mechanism 28 includes, in addition to the hooking member 26 above, a sensing lever 34, a cam plate 36, and an open lever 38. The hooking member 26, the sensing lever 34, and the cam plate 36 are resiliently urged in the clockwise direction in FIG. 4, whereas the open lever 38 is resiliently urged in the counterclockwise direction. The hooking member 26 is disposed on the front side in FIG. 4, the cam plate 36 is disposed at the back thereof, and the sensing lever 34 and the open lever 36 are disposed at the further back thereof and arranged side by side in a nearly vertical direction.

When the first striker 14a enters from the back side and passes while pushing up the corner portion 26d, the hooking member 26 rotates clockwise again due to the resilient force, resulting in engagement of the first striker 14a and the engaging groove 26a. This engagement locks the seat back 12b in the first standing position. Furthermore, in a state where the hooking member 26 is temporally rotated counterclockwise by operating the open lever 38, by inserting the first striker 14a along the line L1 to return the hooking member 26 to the original position, the first striker 14a fits in the loose-fit groove 26b, and engagement occurs between the second striker 14b and the engaging groove 26a. This engagement locks the seat back 12b in the second standing position.

The sensing lever 34 is a member that is pivotally supported by a rotating shaft 34a located at the center and changes its angle by abutment/non-abutment between a detection portion 34b located at the rear end and the striker 14, and a pin 34c located at the front end displaces the cam plate 36.

The cam plate 36 is pivotally supported by a rotating shaft 36a located at the front upper end, and when the striker 14 engages with the engaging groove 26a, a cam surface 36b located at the lower part presses a restraint pin 26g of the hooking member 26, thereby stabilizing the hooking member 26. The cam plate 36 prevents the hooking member 26 from excessively rotating by an interlock surface 36c located at the rear part receiving an interlock pin 26f of the hooking member 26 when the restraint pin 26g exposed to a large external force pushes up the cam surface 36b. The cam plate 36 is slightly rotated by a pin 36d being operated by the open lever 38 for disengagement of the striker 14 and the engaging groove 26a. This operation allows the interlock pin 26f to enter a run off 36e, thereby allowing counterclockwise rotation of the hooking member 26, resulting in a disengagement of the striker 14 and the engaging groove 26a.

The open lever 38 is pivotally supported by a rotating shaft 38a located at the upper part, and is rotated by a rod that is connected to a rod hole 38b. When the open lever 38 is rotated by the rod, a cam release lever surface 38c slightly pusses up the pin 36d, and further a cam holding curved surface 38d that has a fan-like shape slidingly contacts the pin 36d, holding its position. This operation holds the cam plate 36 in the proper release position. Additionally, when the open lever 38 is rotated by the rod, a hook releasing protrusion 38e pushes up the interlock pin 26f and the hooking member 26 is rotated to the proper release position, resulting in, as described above, the disengagement of the striker 14 and the engaging groove 26a. That is, the interlock pin 26f also serves as a hook releasing pin for releasing the striker 14.

Figure 5:
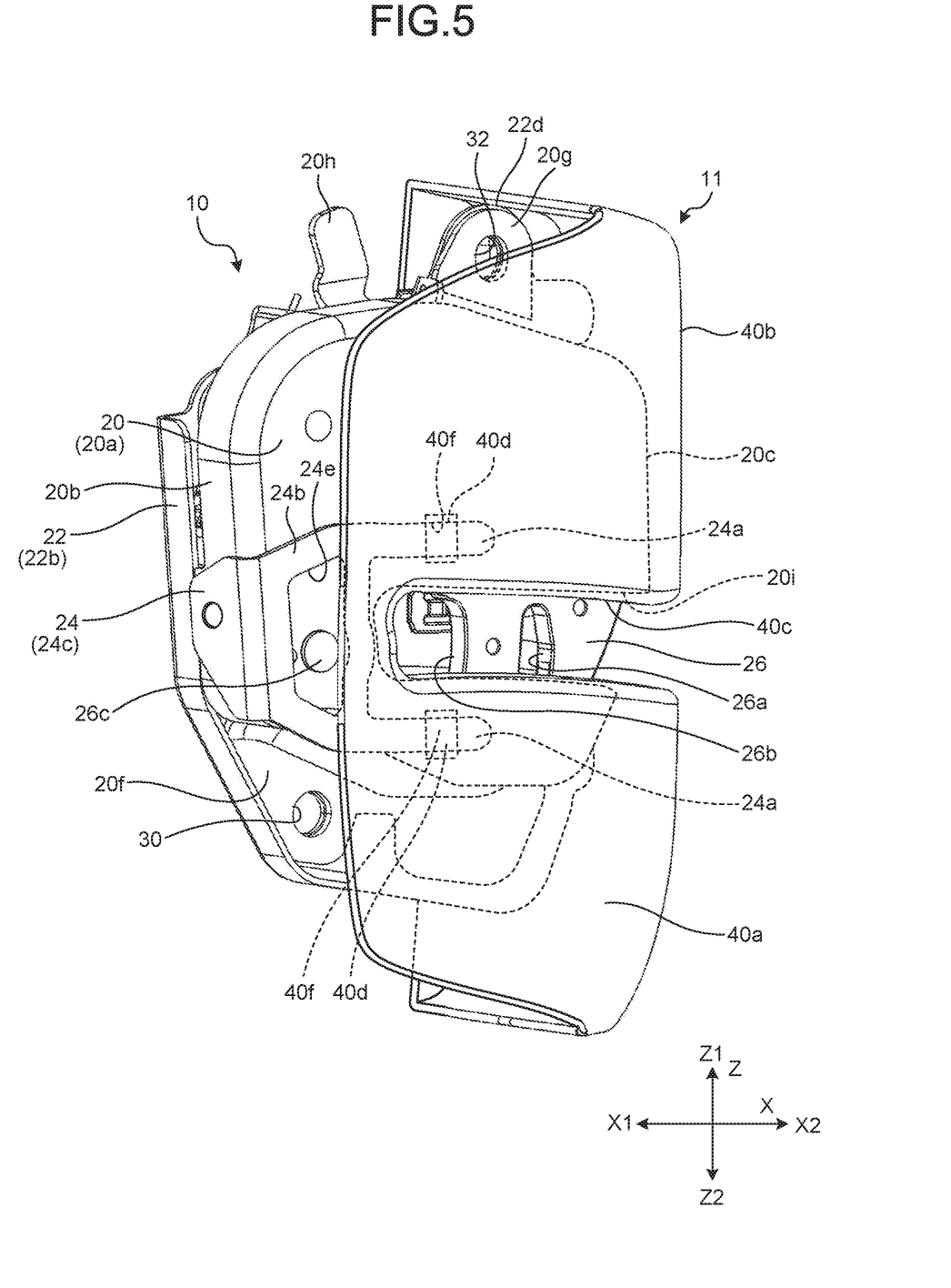
FIG. 5 as a perspective view of the seat lock apparatus with a cover fitted thereto.

As illustrated in FIG. 5, in the seat lock apparatus 10, the most part of the outer surface 20a and almost all the rear surfaces 20c, 22c are covered with the cover 11.

Figure 6:
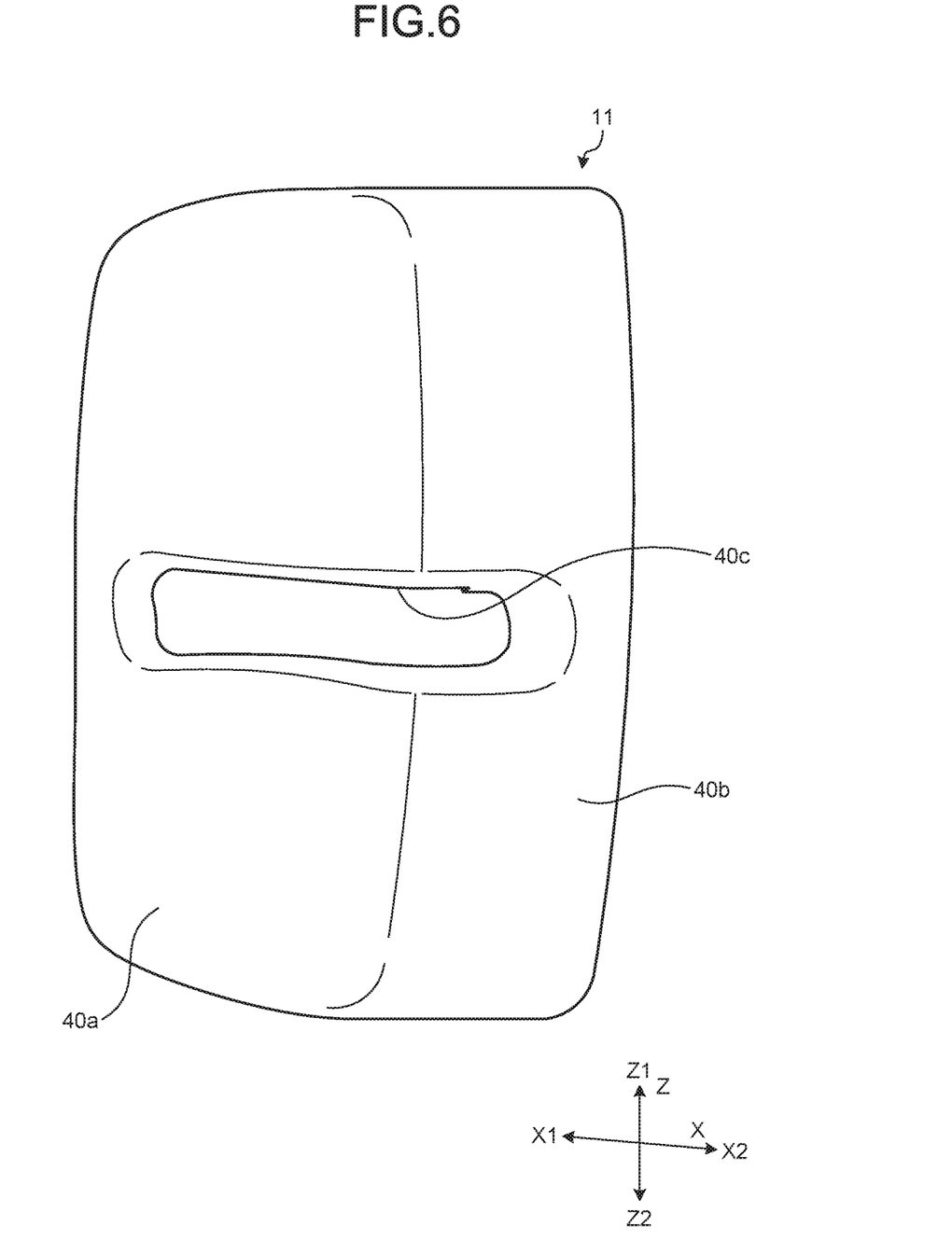
FIG. 6 is a perspective view of the cover.

As illustrated in FIG. 5 and FIG. 6, the cover 11 includes a side surface 40a, a back surface 40b, and a striker opening 40c. The side surface 40a and the back surface 40b are connected via a gently bent portion. The side surface 40a covers many components including the outer surface 20a, the mounting piece 20g, and the mounting piece 20f of the seat lock apparatus 10. The side surface 40a has a substantially triangular shape whose front part is narrow and spreading backward, and the front top part is located in the vicinity of the rotating shaft 26c. The back surface 40b covers most of the surface including the rear surface 20c, the mounting piece 20g, the mounting piece 20f, and the rear surface 22c of the seat lock apparatus 10.

The striker opening 40c is provided at the center height position of the cover 11, and opens from the rear end to the vicinity of the front end on the side surface 40a and opens inward from the outer end to the substantially center position on the back surface 40b. The striker opening 40c is located at the position corresponding to the striker entry groove 20i described above, and is formed to be slightly narrower than the striker entry groove 20i. The striker opening 40c has a shape that is smoothly constricted toward the inside. The edge of the striker entry groove 20i is covered with the cover 11, thus not exposed.

Figure 7:
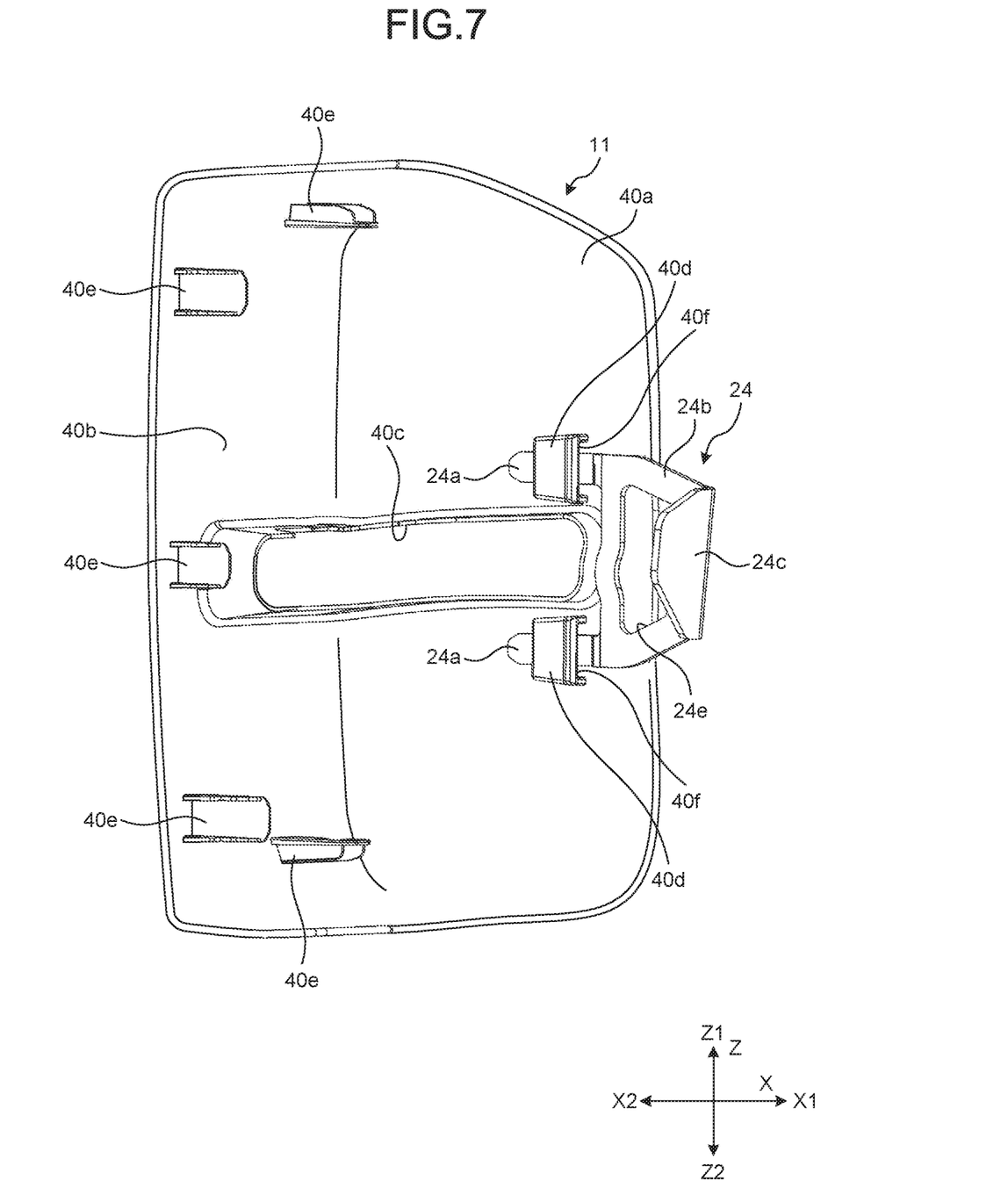
FIG. 7 is a perspective view of the cover engaged with a cover holding member as seen from the inside.

As illustrated in FIG. 7, the cover 11 includes, on its inner surface, a pair of holding member insertion portions 40d and a plurality of engaging claws 40e. The holding member insertion portions 40d are low bridging members that are provided respectively at the upper and lower positions of the striker opening 40c in the vicinity of the front end of the side surface 40a, and are each formed with a holding member insertion hole 40f that communicates with the front and rear. The pair of holding member insertion holes 40f is formed so that the pair of projectional holding pieces 24a fits in with enough depth and moderate friction. Note that, in FIG. 7, for understanding of engagement between the holding member insertion hole 40f and the projectional holding piece 24a, the individual cover holding member 24 is illustrated together with the cover 11.

The engaging claws 40e are provided at positions slightly away from the holding member insertion portions 40d. The engaging claws 40e and the holding member insertion portions 40d are provided in the vicinity of the outer periphery of the inner surface of the cover 11 and distributed in a well-balanced manner. For installing the cover 11, first, by sliding it from the back to the front, the pair of projectional holding pieces 24a fits in the pair of holding member insertion holes 40f. This fitting fixes the front portion of the cover 11 to the seat lock apparatus 10. Furthermore, the engaging claws 40e are engaged with engaging portions that are provided on the seat back 12b. This engagement fixes the rear, upper, and lower portions of the cover 11 to the seat back 12b.

In this way, the cover 11 is held by not only the seat back 12b but also the projectional holding pieces 24a of the cover holding member 24, thereby being stabilized. Because the seat lock apparatus 10 is a two-stage locking type, and the striker entry groove 20i is slightly long and the size thereof is large as a whole, it is necessary to cover the area surrounding the striker entry groove 20i slightly widely on the side surface, but this area may not be fixed to the seat back 12b. Thus, holding a part of this area with the projectional holding pieces 24a stabilizes the cover 11. Particularly, although if no measure is taken the cover 11 will be unstable because the side surface 40a of the cover 11 is slightly wide and the striker opening 40c that is slightly long is provided on the center of the side surface 40a, the holding member insertion portions 40d that are provided at the upper and lower positions of the striker opening 40c in the vicinity of its front end engage with the projectional holding pieces 24a, stabilizing the cover 11. Fitting/releasing of the projectional holding pieces 24a to/from the holding member insertion portions 40d can be made through an easy operation of just sliding forward/backward the cover 11, thus eliminating traditional operation from two directions.

The cover holding member 24 is stable because the side abutment plate 24b and the front abutment plate 24c abut on the range from the outer surface 20a to the front surface 20b of the outer case 20 in a bridging manner.

The present disclosure is of course not limited to the above embodiment and may freely be modified in a range without departing from the gist of the present disclosure.

REFERENCE SIGNS LIST

10 Seat lock apparatus
11 Cover
12b Seat back
14 Striker
14a First striker
14b Second striker
20i, 22e Striker entry groove
20 Outer case
20a Outer surface
20b, 22b Front surface
20c, 22c Rear surface
20f, 20g, 22d Mounting piece
22 Inner case
24 Cover holding member
24a Projectional holding piece
24b Side abutment plate
24c Front abutment plate
24d Emboss
24e Opening hole
26 Hooking member
26a Engaging groove
26c Rotating shaft
30, 32 Bolt hole
40e Engaging claw
40a Side surface
40b Back surface
40c Striker opening
40d Holding member insertion portion
40f Holding member insertion hole

The invention claimed is:

1. A seat lock apparatus that keeps a seat back of a vehicle in a locked state, and is at least partially covered with a cover, the seat lock apparatus comprising:
   a hooking member having an engaging groove that engages with a striker that enters from a back side;
   a shaft member that rotatably and pivotally supports the hooking member in a vicinity of a front end;
   a case member to which the shaft member is fixed;
   a striker entry groove formed on the case member and to which the striker enters; and
   a pair of projectional holding members provided respectively on both sides of the striker entry groove and projecting backward, wherein
   the cover is held by inserting the pair of projectional holding members into a holding member insertion hole provided on the cover.

2. The seat lock apparatus according to claim 1, wherein the case member includes a case side portion on which the striker entry groove is formed,
   the pair of projectional holding members projects from a side abutment plate that abuts on the case side portion, and
   the side abutment plate includes an opening hole.

3. The seat lock apparatus according to claim 1, further comprising:
   a front abutment plate fixed to a front portion of the case member, wherein the projectional holding members are connected via a bent portion that is bent backward from the front abutment plate.

4. The seat lock apparatus according to claim 1, wherein the striker is a first striker, and the first striker moves integrally with a second striker that is separated by a fixed distance, and the engaging groove engages with the first striker or the second striker to lock the seat back at a two-stage inclination angle.

* * * * *